INVENTOR.
Romeo M. Nardone
BY
ATTORNEY.

Patented Apr. 13, 1937

2,077,253

UNITED STATES PATENT OFFICE 2,077,253

DRIVING MECHANISM

Romeo M. Nardone, East Orange, N. J., assignor, by mesne assignments, to Eclipse Aviation Corporation, East Orange, N. J., a corporation of New Jersey Original application September 15, 1931, Serial No. 562,938, now Patent No. 1,990,306. Divided and this application January 7, 1935, Serial No. 793

8 Claims. (Cl. 192—48)

This invention relates to driving mechanisms, and more particularly to a multiple clutch driving mechanism.

An object of the invention is to provide in conjunction with a driving element and a plurality of alternately driven elements, novel means for converting one of the driven elements into a driving element for the purpose of transmitting torque to another driven element, and at the same time disengaging the first-named driving element.

Another object is to provide an improved type of clutch and clutch control mechanism, as hereinafter set forth, one of the many possible embodiments thereof being shown in the drawing, wherein.

Figure 1:
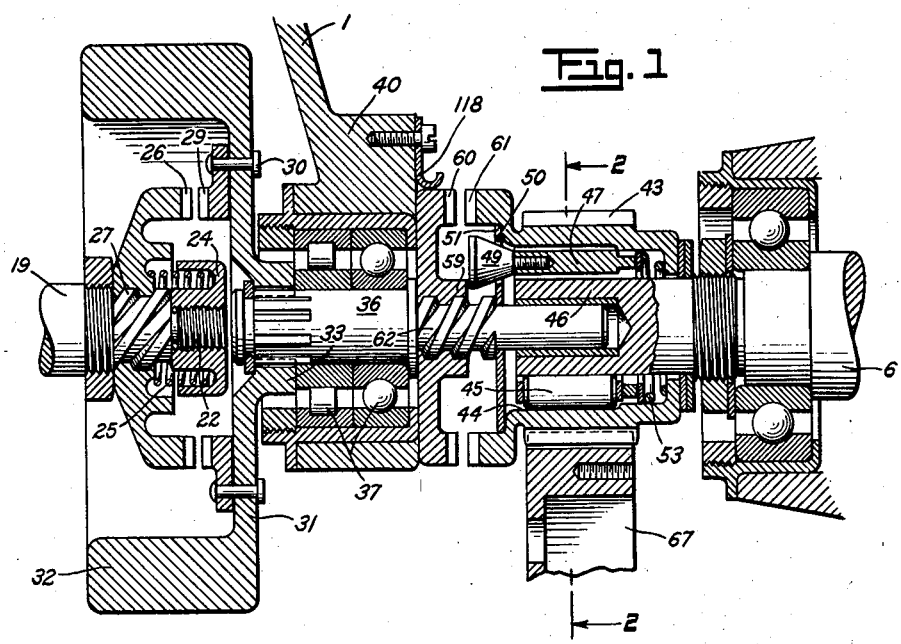
Fig. 1 is a central longitudinal section of one form of mechanism embodying the present invention.

The illustrated embodiment of the invention includes a shaft 19 terminating in a threaded end 22 of considerably smaller diameter, on which end is threaded a cup member or retaining member 24 for a coiled spring 25, the opposite end of which engages and normally holds a clutch member 26 in the position indicated in Fig. 1. As shown, the clutch member 26 is mounted on the shaft 19 in threaded engagement with the thread 27 thereof, said threads being of a relatively large pitch as a result of which construction, rotation of the shaft 19 causes an axial movement of the jaw member 26 into engagement with the complemental jaw member 29 riveted or otherwise suitably secured as indicated at 30 to a web 31 of a flywheel 32. The web 31 of the flywheel turns outward near the central portion thereof to form a hub 33 splined or otherwise suitably connected to a shaft 36 rotatably supported on bearings 37 mounted in a boss 40 formed on the casing 1.

Figure 2:
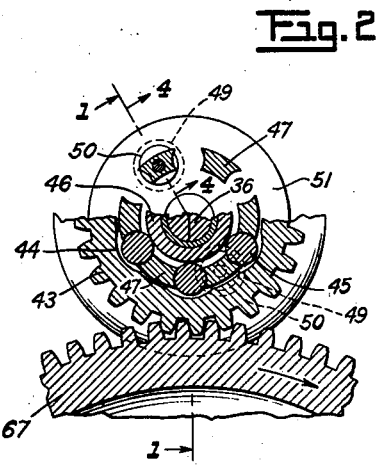
Fig. 2 is a transverse sectional view of one of the clutch assemblies constituting part of the mechanism shown in Fig. 1, the view being taken along the line 2—2 of Fig. 1.

A bidirectional clutch mechanism of novel construction is interposed between the shaft 36 and the gear 43 for the purpose of achieving the first of the above recited objects of the invention. As best shown in Fig. 2, the clutch mechanism comprises a toothed member or pinion 43 having cam surfaces 44 formed on the internal cylindrical surface thereof at equally spaced radial distances for the reception of rollers 45 which are thus interposed between the pinion and the forward end 46 of a shaft 6, constituting one of the alternative "driven members" of the appended claims, the gear 67 being the other driven member—although also capable of driven members 6 (through clutch rollers 45).

A cage 47 surrounds and guides the rollers 45 while at one end of the cage are threaded or otherwise secured two or more conical surfaced members 49 adapted to register with cam surfaces 50 in a control ring 51, the latter being pressed into or otherwise rigidly retained in the pinion 43. Normally, (that is, while the member 67 is driving) the cage is urged to the left, as shown in the drawing (Fig. 3) by spring 53, thereby moving the conical members 49 to the position shown in Fig. 3, in which position there is permitted a slight relative movement of the cage and rollers, with respect to the control ring 51 and also with respect to the pinion 43. This movement permits rollers 45 to be carried into wedging driving relation with the shaft 46 in response to the application of driving torque to the teeth of pinion 43, and from the teeth of gear 67.

Figure 4:
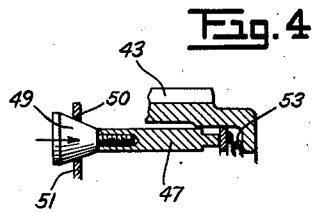
Fig. 4 is a section along line 4—4 of Fig. 2.

Associated with the novel bidirectional clutch mechanism just described is an additional clutch mechanism adapted to drivably connect members 32 and 67, and at the same time render said first-named clutch mechanism ineffective to drive the member 6. As shown, such clutch mechanism is similar in construction to that indicated at 26 and 29 and involves a similar pair of complemental clutch members 60 and 61, the latter being drivably connected to, or as herein shown, constituting an integral extension of the pinion 43, while the former has a hub 59 threaded to the threaded portion 62 of the shaft 36 for longitudinal movement thereof, in response to rotation of the shaft 36. When such meshing movement of the clutch member 60 occurs, it is evident that the cage 47 will be pushed to the right by the hub 59 of member 60, against the force of the spring 53 so that the conical members 49 will make contact around the whole circumference of cam surfaces 50 of the ring 51 as shown best in Fig. 4. In this position the rollers 45 are held out of their wedging relation to the shaft 46, that is, in the neutral bidirectional position indicated in Fig. 2.

Figure 3:
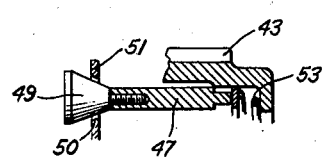
Fig. 3 is an enlarged fragmentary detail of the clutch assembly shown in Fig. 2.

Prior to starting, the parts are at rest in the relative positions indicated in Figs. 1, 2 and 3, in which position the clutch members 26—29, 60—61, are all in non-driving positions, while the roller clutch shown in Fig. 2 is under the influence of spring 53.

With the parts in these positions, the driving shaft 19 is energized, whereupon clutch member 26 moves into registry with the complemental clutch member 29 and establishes driving connection with the flywheel 32.

Rotation of flywheel 32 and shaft 36, connected thereto, causes clutch member 60 to move to the right on threads 62, its rotary tendency being restrained by friction spring 118. This movement to the right drivably connects members 60 and 61 and hence drives gear 67 through pinion 43, the rollers 45 being held in the free position by the pressure of hub 59 on cams 49 of the roller cage. The drive continues in the direction stated until (for any reason) the speed of the members 67 and 43 exceeds that of shaft 36. When and if this occurs it will cause a reverse screw action which throws 60 back and causes rollers 45 to become operative to drive the shaft 46 (under the action of spring 53), and hence the driven element 6, the clutch operation being as above explained.

This application is a division of my co-pending application No. 562,938, filed Sept. 15, 1931 which has matured into Patent No. 1,990,306.

What is claimed is:

1. In a driving mechanism, a driving member, a driven member, a normally engaged clutch mechanism drivably connected to the driven member, and means controlled by the inertia of the driving member for disabling such clutch mechanism, said last named means comprising a threaded portion on said driving member and a correspondingly threaded member co-operating therewith to move said driving member axially into engagement with said clutch mechanism in response to rotation of said threaded member.

2. In a driving mechanism, a driving member, a driven member, a normally engaged clutch mechanism drivably connected to the driven member, and means controlled by the inertia of the driving member for disabling such clutch mechanism, said last named means comprising an obliquely grooved portion on said driving member and a correspondingly grooved member co-operating therewith to move said driving member axially into engagement with said clutch mechanism in response to rotation of said threaded member.

3. In a driving mechanism, a driving member, a driven member, a normally engaged clutch mechanism drivably connected to the driven member and spaced axially from the driving member, and means controlled by the axial movement of the driving member for disabling such clutch mechanism and torque actuated means operable upon said driving member to cause axial movement thereof.

4. In a driving mechanism, a driving member, a driven member, clutch rollers normally drivably connected to the driven member, means comprising a threaded portion on said driving member and a correspondingly threaded member co-operating therewith to move said driving member in response to rotation of said threaded member, and means responsive to such axial movement to shift said rollers to the nondriving position.

5. In a driving mechanism, an inner clutch race, an outer clutch race, a plurality of rollers therebetween, a roller cage retaining said rollers, said cage having an axial extension, and torque responsive means engageable with said axial extension to cause relative angular movement between one of said races and said cage, said engageable means including a driving element operative to transmit torque through said roller clutch in response to reversal of such relative angular movement.

6. In a driving mechanism, an inner clutch race, an outer clutch race, an apertured ring secured to one of said races, a cage containing a plurality of rollers interposed between said races, and torque responsive means engageable with said ring at the apertured portion thereof to cause relative angular movement between the roller cage and the race to which said ring has been secured.

7. In a driving mechanism, an inner clutch race, an outer clutch race, an apertured ring secured to one of said races, a cage containing a plurality of rollers interposed between said races, and means engageable with said ring at the apertured portion thereof to cause relative angular movement between the roller cage and the race to which said ring has been secured, said last named means including an extension of said roller cage having a surface engaging the apertured portion of said ring in a manner to cause partial rotation of said cage in response to axial movement of said extension.

8. In a driving mechanism, an inner clutch race, an outer clutch race, an apertured ring secured to one of said races, a cage containing a plurality of rollers interposed between said races, and means engageable with said ring at the apertured portion thereof to cause relative angular movement between the roller cage and the race to which said ring has been secured, said last named means including an extension of said roller cage having a surface engaging the apertured portion of said ring in a manner to cause partial rotation of said ring in response to axial movement of said extension, and clutch driving means engageable with said extension to produce such axial movement.

ROMEO M. NARDONE.